United States Patent [19]

Kashiwagi

[11] Patent Number: 4,486,935
[45] Date of Patent: Dec. 11, 1984

[54] COIL SPRING COMPRESSOR FOR USE IN THE ASSEMBLY OF AUTOMOTIVE SUSPENSION SYSTEMS

[75] Inventor: Hiroo Kashiwagi, Toyota, Japan

[73] Assignee: Toyota Jidosha Kabushiki Kaisha, Toyota, Japan

[21] Appl. No.: 468,874

[22] Filed: Feb. 23, 1983

[30] Foreign Application Priority Data

Feb. 23, 1982 [JP] Japan .......................... 57-024974[U]

[51] Int. Cl.³ ............................................. B23P 19/04
[52] U.S. Cl. ...................................... 29/227; 254/10.5
[58] Field of Search .................. 29/227, 225, 215, 216, 29/217, 218; 254/10.5

[56] References Cited

U.S. PATENT DOCUMENTS

| 4,009,867 | 3/1977 | Diffenderfer | 254/10.5 |
| 4,295,634 | 10/1981 | Spainhour et al. | 29/227 |
| 4,395,020 | 7/1983 | Spainhour | 29/227 |

FOREIGN PATENT DOCUMENTS 3021084 12/1981 Fed. Rep. of Germany ..... 254/10.5

OTHER PUBLICATIONS 56-109826; 1981; Japanese Utility Model Pub.
57-1630; 1/6/82; Japanese Pat. Pub.

*Primary Examiner*—James L. Jones, Jr.
*Attorney, Agent, or Firm*—Finnegan, Henderson, Farabow, Garrett & Dunner

[57] ABSTRACT

A coil spring compressor adapted for use in the assembly of automotive suspension systems, particularly, of the MacPherson type. The coil spring compressor includes a head plate movable vertically with respect to a base on which a MacPherson strut forming part of the suspension system to be assembled is held in position. A clamp carriage having a frontal opening is mounted to the head plate for vertical sliding movement relative to the head plate to adjust the vertical position of the clamp carriage. The clamp carriage is provided with four clamping arms, each of which is pivoted at its outer end to the carriage and has at its inner end a clamping hook engageable with the selected turn of the coil spring. Two clamping arms forming a pair are arranged along a side of the frontal opening and two clamping arms forming another pair are arranged along the opposite side thereof, the front and rear clamping arms in each pair being interconnected with each other so as to swing conjointly. A pair of operating handles are connected to the front clamping arms. One of the clamping arms in one pair is interconnected with one of the clamping arms in the other pair by way of a linkage so that on actuating any one of the operating handles all the four clamping arms are swung in concert with an equal angular movement toward and away from the coil spring to be compressed, whereby the coil spring is automatically centered with respect to the center of the strut.

3 Claims, 7 Drawing Figures

COIL SPRING COMPRESSOR FOR USE IN THE ASSEMBLY OF AUTOMOTIVE SUSPENSION SYSTEMS

BACKGROUND OF THE INVENTION

1. Field of the Invention

The present invention relates to a coil spring compressor which is used in the assembly of subassemblies of automotive front or rear suspension systems, in particular, MacPherson type suspension systems.

2. Description of the Prior Art

Certain types of automotive suspension system such as of the MacPherson type comprise a suspension subassembly. The subassembly includes a strut formed by a lower tube. The strut includes a built-in shock absorber. A part of a piston of the shock absorber projects upward from the strut in a telescoping fashion. A coil spring is mounted in a compressed state around the strut between a lower spring seat integral with the strut and an upper spring seat fastened to the upper end of the piston of the shock absorber. Such a suspension subassembly is assembled separately and then mounted as a unit in a vehicle body.

During the assembly of a MacPherson type suspension subassembly, the coil spring is passed from above around the stanchion with its lower end abutting against the lower spring seat. The coil spring is then compressed by a suitable power tool to bring the upper end of the coil spring below the upper end of the piston of the shock absorber, so that the piston upper end protrudes beyond the coil spring upper end. The upper spring seat is then fastened to a threaded part of the upper end of the shock absorber piston by a nut. As a result, the coil spring is retained between the upper and lower spring seats in a compressed state.

In the copending patent application Ser. No. 453,839 filed Dec. 28, 1982, and assigned to the assignee of the present invention, there is disclosed a coil spring compressor suitably used for compressing a coil spring during the assembly of MacPherson type suspension subassemblies. This coil spring compressor comprises a base, a movable head plate positioned above the base for translational movement thereto, and means for driving the head plate toward and away from the base. The head plate is provided with a pair of spaced guide bars connected thereto and suspended therefrom. A clamp carriage is mounted on the guide bars for vertical sliding movement through a predetermined distance. The clamp carriage is provided with a frontal opening having a sufficient size to receive therethrough without interference a coil spring to be compressed. The clamp carriage is provided with four clamping arms, each of which is pivoted at an end to the carriage and is provided at the other end with a clamping hook projecting toward and engageable with any selected turn of the coil spring. The four clamping arms are grouped into two pairs, one of which is arranged along one side of the frontal opening of the carriage and the other along the opposite side. The front and rear clamping arms in each pair are interlocked with each other so that when the front arm in each pair is rotated toward and away from the coil spring, the rear arm swings conjointly with the front arm toward and away from the coil spring. The front clamping arm in each pair is provided with an operating handle. In use, the operator first slides the clamp carriage upward and downward along the guide bars and adjusts the vertical position of the carriage so that the clamping hooks are leveled between the desired successive turns of the coil spring, normally between the first and second turns. Then, the operator closes the handle together to insert the clamping hooks between the selected turns of the coil spring and turns on the drive means to lower the head plate. As the head plate travels downward, the clamping hooks are urged againt the second turn of the spring and compress the same to the desired degree.

In the coil spring compressor of the type described, however, the operator has to actuate both operating handles at one time in order to bring the four clamping hooks into engagement with the coil spring. In addition, the speeds of closing movement for each operating handle must be the same in order to position the coil spring concentrically with the MacPherson strut. If one of the handles is moved faster than the other, the pair of clamping hooks associated with that handle will first engage the coil spring, causing it to displace toward the other pair of clamping hooks until it abuts against the latter. This will result in the coil spring being off center with respect to the strut.

SUMMARY OF THE INVENTION

An object of the present invention is to provide a coil spring compressor of the type described wherein all the clamping hooks are moved simultaneously by actuating either one of the operating handles.

Another object of the present invention is to provide a coil spring compressor which is capable of automatically centering the coil spring with the strut.

According to the invention, there is provided a coil spring compressor of the kind described wherein one of the clamping arms in one pair is interconnected with one of the clamping arms in other pair by means of a linkage so that, on actuating any one of the operating handles, all the four clamping arms are swung in concert and with equal angular movement toward and away from the coil spring to be compressed. Preferably, the linkage interconnects the front clamping arm in one pair to the rear clamping arm in the other pair. The linkage may comprise a C-shaped link bar which extends along the frontal opening of the clamp carriage in such a manner as not to interfere with the coil spring to be compressed. With this arrangement, it is possible to move all the clamping hooks simultaneously by actuating only one of the operating handles. Further, as all the clamping arms are moved at an equal angular speed toward the center of the suspension strut, the coil spring is automatically centered with respect to the strut.

DESCRIPTION OF THE PREFERRED EMBODIMENT

Figure 1:
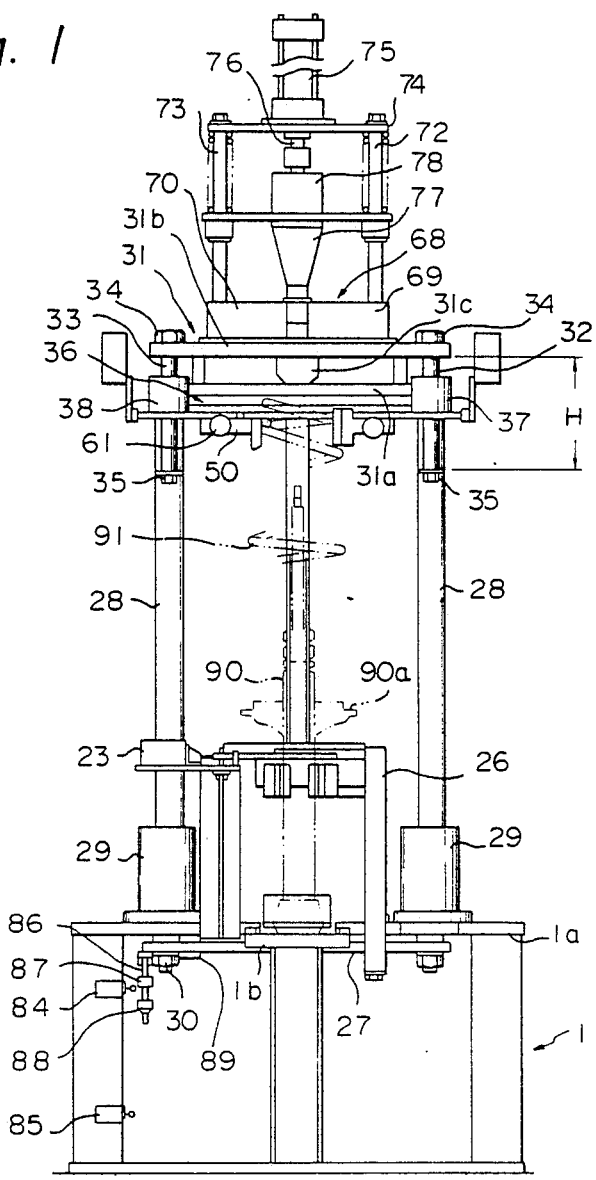
FIG. 1 is a front elevational view of an embodiment of the coil spring compressor according to the invention.
Figure 2:
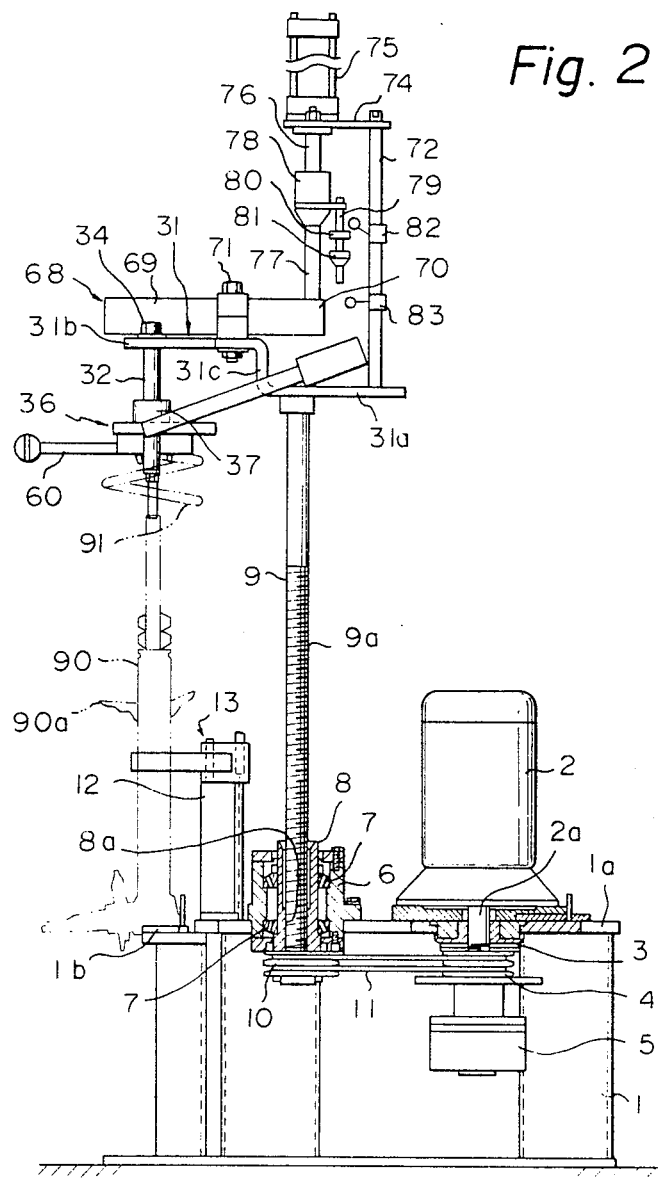
FIG. 2 is a left-hand side elevational view of the embodiment of FIG. 1.

Referring now to the drawings, FIGS. 1 and 2 illustrate an embodiment of the coil spring compressor according to the invention. The coil spring compressor includes a base 1 having a top plate 1a positioned at a predetermined level. An electric motor 2 is mounted on the top plate 1a with its shaft 2a projecting downward therefrom. The motor 2 is of the reversible type and its shaft 2a is connected to a driving pulley 4 through an electromagnetic clutch 3. The pulley 4 is mounted rotatably above a brake 5 which cooperates with the clutch 3 to brake the pulley when the latter is disconnected from the motor shaft 2a. In front of the motor 2, the top plate 1a is provided with a tubular housing 6 in which a drive sleeve 8 is mounted for rotation by means of a pair of axial thrust bearings 7. The drive sleeve 8 has internally threaded portions 8a which are in meshing engagement with the externally threaded portions 9a of a vertically movable drive shaft 9 extending through the drive sleeve 8. The lower end of the sleeve 8 projects downward beyond the top plate 1a and a driven pulley 10 is connected thereto for rotatation therewith. Endless belts 11 are entrained over the pulleys 4 and 10, so that when the driving pulley 4 turns in one direction, the driven pulley 10 is rotated together with the drive sleeve 8 causing the drive shaft 9 to move upward, and vice versa.

In front of the sleeve housing 6, a support 12 is rigidly fixed on the top plate 1a. This support 12 supports at its top a clamping mechanism 13 for clamping a strut 90 forming part of the MacPherson type automotive suspension system.

A bed plate 1b is mounted on the forward end of the top plate 1a underneath the strut clamping mechanism 13 for placing the strut 90 thereon.

Figure 3:
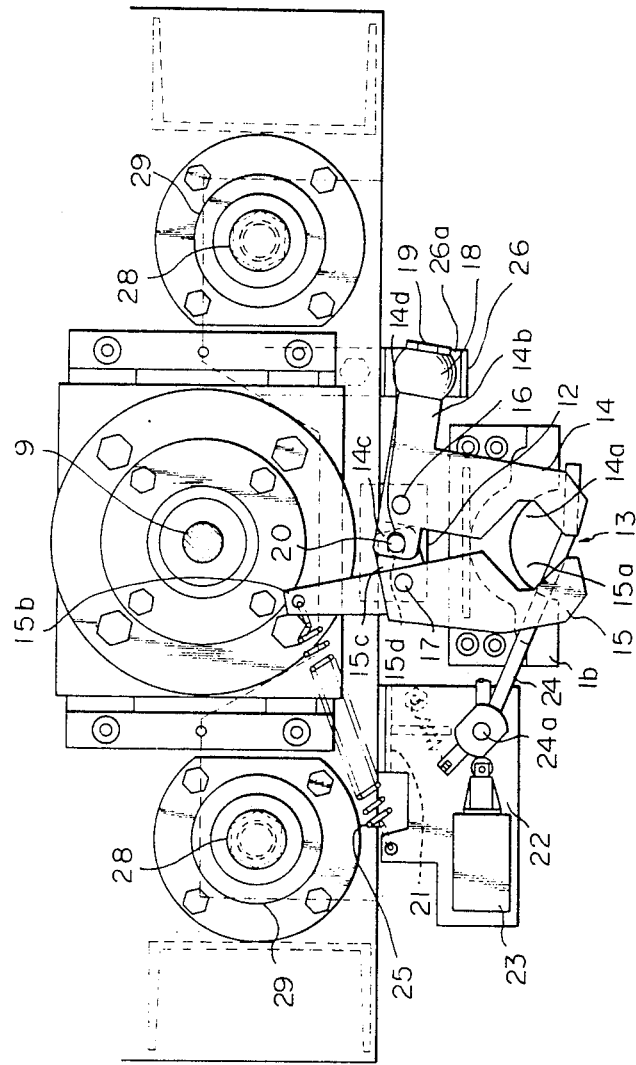
FIG. 3 is a top plane view of a strut clamping mechanism.

As shown in FIG. 3, the clamping mechanism 13 includes a pair of swingable clamping arms 14 and 15 pivoted to the support 12 by means of pins 16 and 17, respectively. The arms 14 and 15 are provided near the forward ends thereof with opposing triangular recesses 14a and 15a defining clamping jaws. The rear end of the left-hand arm 14 extends at a right angle to the remaining part of the arm to form a lever 14b, at the end of which a roller 18 is mounted rotatably by way of a pin 19. The rear end of the arm 14 opposite the lever portion 14b is formed into a coupling portion 14c having a slot 14d. The right-hand arm 15 is provided with a lever portion 15b and is also provided with a coupling portion 15c projecting toward the associated coupling portion 14c of the left-hand arm 14 and having a slot 15d. A coupling pin 20 is engaged within the slots 14d and 15d to couple the arms 14 and 15 together.

Figure 4:
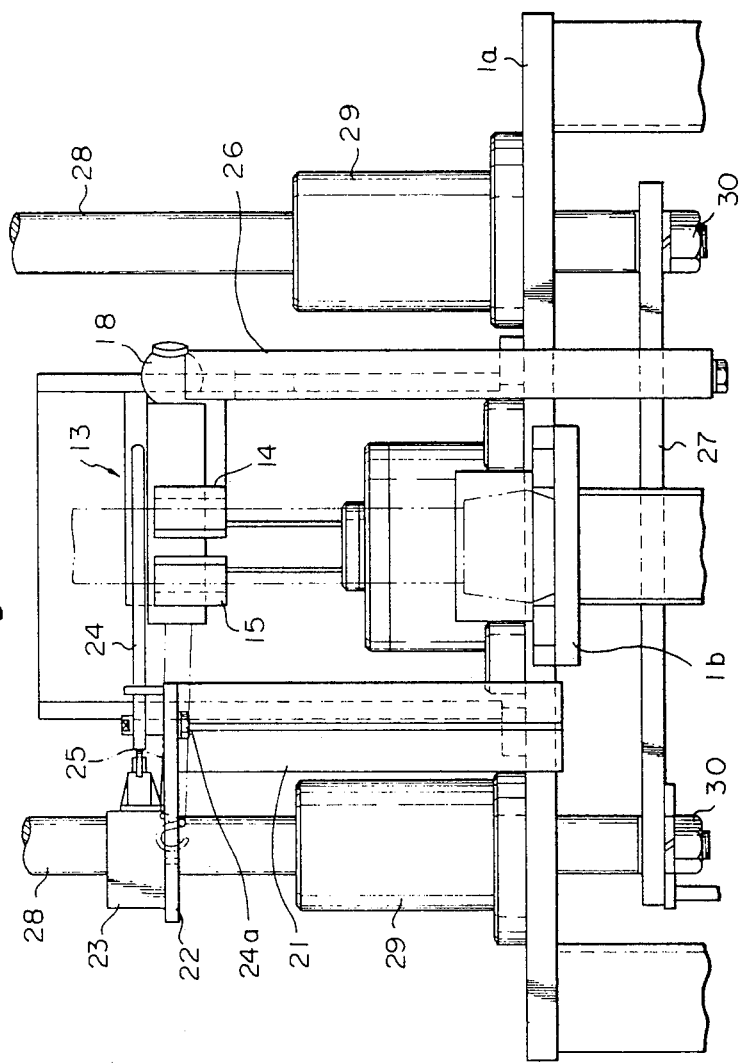
FIG. 4 is a front elevational view of the strut clamping mechanism of FIG. 3.

As shown in FIGS. 3 and 4, a switching mechanism for the clamping arms 14 and 15 includes a T-shaped support 21 which is mounted to the top plate 1a and carries at its top a switch mounting plate 22. A sensing lever 24 is pivoted to the switch mounting plate 22 by a bolt 24a and is adapted to engage with a limit switch 23 which is connected to the motor 2.

Referring to both FIGS. 3 and 4, compression coil spring 25 is tensed between the switch mounting plate 22 and lever portion 15b of the clamping arm 15 so as to rotate the arm 15 about its pivot 17 in the counterclockwise direction as viewed in FIG. 3.

The closing and opening movement of the strut clamping arms 14 and 15 of the clamping mechanism 13 is controlled by a cam bar 26 mounted on a cross member 27 which is adapted to move upward and downward together with the drive shaft 9. The cam bar 26 is provided at its top with a rearwardly inclined cam surface 26a which engages with the roller 18 of the clamping arm 14. The cam surface 26a is so arranged that when the cam bar 26 rises, it urges the roller 18 causing the arm 14 to swing about the pin 16 in the counterclockwise direction as viewed in FIG. 3, the movement of the arm 14 being transmitted through the coupling pin 20 to the other arm 15 causing it to swing in the clockwise direction about its pivot 17 against the action of the return spring 25 so that the arm 14 and 15 move away from each other to open the clamping mechanism 13. To the contrary, when the cam bar 26 lowers, the cam surface 26a releases the roller 18 allowing the arm 15 to return counterclockwise under the spring action so that the arm 14 rotates in the clockwise direction to close the strut clamping mechanism 13.

As shown in FIG. 2, a head plate 31 is rigidly connected to the top of the movable shaft 9 for upward and downward movement together with the shaft 9. A pair of vertical slide bars 28, 28 are connected at their upper ends to the head plate 31 by means of nuts (not shown) and extend therefrom vertically downward through the top plate 1a. The lower parts of the slide bars 28, 28 are received for sliding movement within a pair of guide blocks 29, 29 mounted on the top plate 1a (FIG. 1). The lower ends of the slide bars 28, 28 projecting below the top plate 1a are connected together by means of the cross member 27 firmly fastened thereto by nuts 30, 30 (FIG. 4). Thus, the drive shaft 9, head plate 31, slide bars 28, 28 and cross member 27 form together a vertically movable framework which moves upward and downward guided by the guide blocks 29, 29 as the drive shaft 9 moves up and down.

Referring to FIGS. 1 and 2, head plate 31 comprises a lower rear part 31a connected to the drive shaft 9 and slide bars 28, 28, an upper frontal part 31b extending at a higher level, and an intermediate part 31c connecting the two parts 31a and 31b. Thus, the head plate 31 has a Z-shaped crosssection leaving a relatively free frontal space thereunder.

A pair of guide bars 32 and 33 are suspended from the upper frontal part 31b of the head plate 31 and are rigidly connected thereto at their upper ends by means of nuts 34.

A carriage 36 for coil spring clamping mechanism is slidably mounted on the guide bars 32 and 33 by means of bosses 37 and 38 forming part of the slidable carriage 36 and having cylindrical apertures in which the guide bars 32 and 33 are passed. A pair of stops 35, 35 are provided at the lower ends of the guide bars 32 and 33 to prevent the carriage 36 from being slipped down out of the bars 32 and 33. The guide bars 32 and 33 have a predetermined length so that the carriage 36 can move along the guide bars through a height H as shown in FIG. 1.

Figure 6:
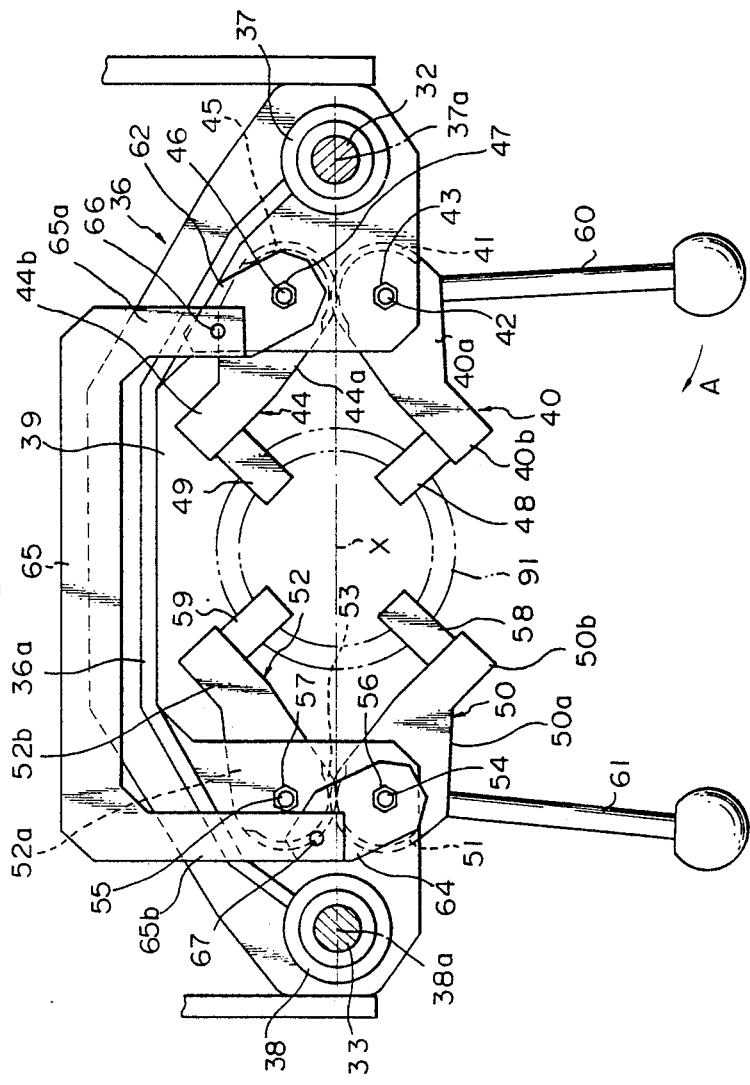
FIG. 6 is a top plane view of the coil spring clamping mechanism of FIG. 5.

As shown in FIG. 6, the clamp carriage 36 is generally C-shaped and has a roughly square frontal opening 39 having a sufficient size not to interfere with a coil spring 91 to be assembled. A rib 36a is formed integral with the carriage 36 to extend between bosses 37 and 38 in parallel with the rear configuration of the carriage. A pair of clamping arms 40 and 44 are mounted on the carriage 36 along a side of the frontal opening 39 and another pair of clamping arms 50 and 52 are mounted along the other side of the opening 39.

Figure 5:
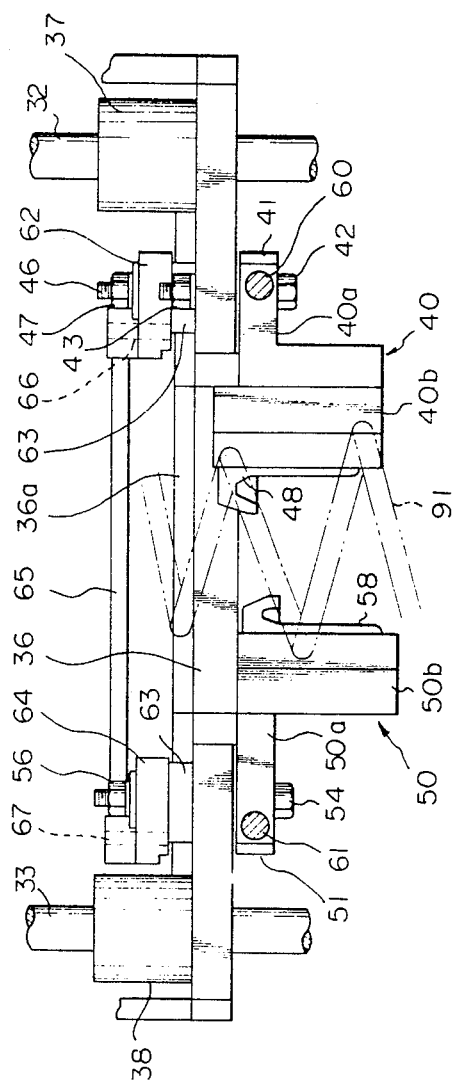
FIG. 5 is a front elevational view of a coil spring clamping mechanism.

As shown in FIGS. 5 and 6, the clamping arms 40, 44, 50, and 52 comprise, respectively, a thin-walled outer portion 40a, 44a, 50a, and 52a by which respective clamping arms are pivoted to the clamp carriage 36 through bolts 42, 46, 54, and 55 fastened by nuts 43, 47, 56, and 57, and a thick-walled inner portion 40b, 44b, 50b, and 52b carrying respective clamping hooks 48, 49, 58, and 59. The outer ends of the clamping arms have a semicircular cross-section and are provided with teeth 41, 45, 51 and 53, respectively. The front clamping arms 40 and 50 are positioned symmetrically to the rear clamping arms 44 and 52 with respect to the plane X including the axes 37a and 38a of the bosses 37 and 38 and are spaced from the corresponding rear clamping arms 44 and 52 so that their teeth 41 and 51 are in mesh with the corresponding teeth 45 and 53. Preferably, the respective clamping hooks 48, 49, 59, and 58 are positioned in sequence at different levels differing with each other by a quarter of the pitch of the coil spring in its relaxed state so that all the clamping hooks engage almost simultaneously with the selected turn of the coil spring (FIG. 5).

A pair of operating handles 60 and 61 are connected to the front clamping arms 40 and 50.

A lever 62 is secured integrally to the rear clamping arm 44 by bolt 46 and nut 47 through a spacer ring 63, while a similar lever 64 is secured integrally to the front clamping arm 50 by means of bolt 54 and nut 56 through another spacer ring 63. The length of the spacers 63, 63 is selected to be greater than the height of the rib 36a so that the levers 62 and 64 swing without abutting against the rib 36a. The levers 62 and 64 are positioned in parallel with each other.

The levers 62 and 64 are coupled together by link bar 65, one end of which is connected by a pin 66 to the lever 62 and the other end of which is connected by a pin 67 to the lever 64. As shown in FIG. 6, the link bar 65 is substantially C-shaped and the upper leg 65a of the C is shorter than the lower leg 65b, so that the central portion thereof extends parallel to the plane X.

Figure 7:
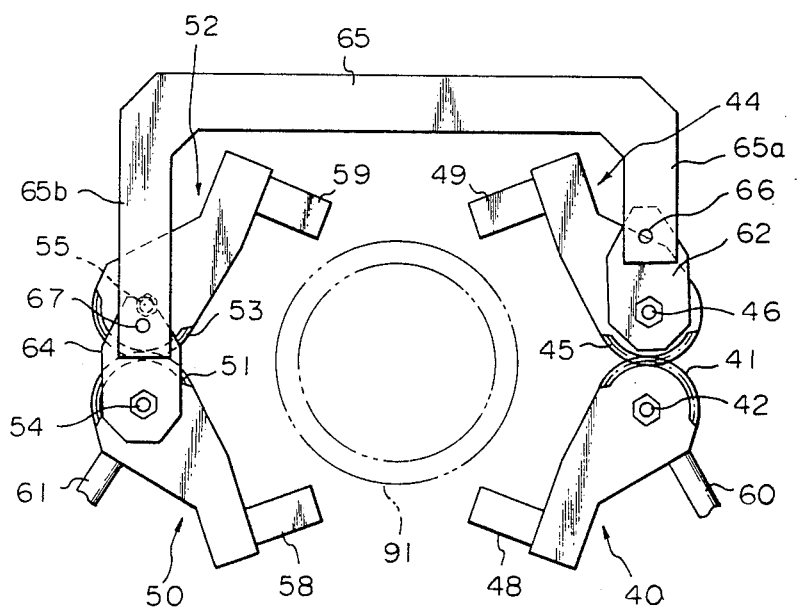
FIG. 7 is a schematic top plane view of the coil spring clamping mechanism showing the clamping arms in their open position.

With this arrangement, on closing the operating handle 60 as shown by the arrow A in FIG. 6 to swing the front clamping arm 40 inward, the associated rear clamping arm 44 rotates counterclockwise due to the meshing engagement of the teeth 41 and 45 together with the lever 62 integral with the arm 44. The angular movement of the lever 62 is transmitted through the link bar 65 to another lever 64 causing it to swing counterclockwise together with the front clamping arm 50 which is integral with the lever 64, so that the rear clamping arm 52 rotates clockwise due to the engagement of the teeth 51 and 53. Thus, all the four clamping arms 40, 44, 50, and 52 simultaneously swing inward at an equal angular speed causing the four clamping hooks 48, 49, 58, and 59 to move toward the coil spring 91 with an equal displacement until all of the clamping hooks are brought into contact with the coil spring, whereby the coil spring is automatically centered regardless of its initial position. A closing movement of another handle 61 will cause inward movement of the hooks in a quite similar manner. On turning either one of the handles 60 and 61 in the reverse direction, all the clamping arms swing outward away from the coil spring so that their hooks are retracted therefrom, as shown in FIG. 7.

Referring again to FIGS. 1 and 2, in order to firmly hold an upper spring seat for retaining the coil spring during the assembly of the suspension system, the head plate 31 is provided with a conventional upper spring seat clamp 68 comprising clamping arms 69 and 70 mounted pivitably to the plate 31 by a bolt 71. The clamping arms 69 and 70 are adapted to be actuated by a wedge-shaped cam plate 77 engaging the rear ends of the clamping arms and connected through a coupling member 78 to an output rod 76 of a pneumatic cylinder 75 mounted on a cylinder support plate 74. The plate 74 is supported by a pair of columns 72 and 73 rigidly connected to the rear part of the head plate 31. The arrangement is such that as the rod 76 of the cylinder 75 moves down the cam plate 77 engages the rear parts of the clamping arms 69 and 70 causing the clamp 68 to open, and vice versa.

The pneumatic cylinder 75 is connected to a suitable compressed air source and is adapted to be controlled by a control valve, not shown, which, in turn, is controlled by a pair of limit switches 82 and 83 mounted on the support column 72. Connected to the coupling member 78 is a bar 79 on which a pair of dogs 80 and 81 are mounted. The dogs 80 and 81 are designed such that on supplying the compressed air into one of the pressure chambers of the cylinder 75 to move the cam plate 77 into engagement with the clamping arms, the dog 81 is brought into contact with the limit switch 83 causing the valve to turn off, whereby the downward movement of the cam bar 77 is stopped, and on supplying the air into another pressure chamber, the cam bar goes up together with the dog 80 which then contacts the limit switch 82 to turn off the air supply.

The base 1 is provided with an upper limit switch 84 and a lower limit switch 85 which cooperate with a pair of dogs 87 and 88 secured to a bar 86 suspended from a plate 89 attached to the cross member 27. These limit switches 84 and 85 serve to limit the upper and lower extremities of the travel of the threaded drive shaft 9. As the motor 2 rotates in one direction to lower the drive shaft 9 together with the integral cross member 27, the dog 88 engages the lower limit switch 85 which turn off the motor 2 and energizes the brake 5. On the contrary, as the motor 2 rotates in the reverse direction to lift the drive shaft 9, the dog 87 engages with the upper limit switch 84 thereby to stop the upward movement of drive shaft 9.

The operation of the coil spring compressor according to the invention is as follows.

At the outset of each cycle of the assemble operation of suspension system, the cam bar 26 is in contact with the roller 18 so that the clamping arms 14 and 15 of the strut clamping mechanism 13 are opened from each other. Also, the coil spring clamping arms and, hence, the clamping hooks are swung outward into the retracted position as shown in FIG. 7. First, a strut 90 with a coil spring 91 in a relaxed state resting upon the lower spring seat 90a is introduced between the clamping arms 14 and 15 and is placed on the bed plate 1b as shown by the phantom line in FIGS. 1 and 2. On being inserted, the strut 90 engages the sensing lever 24 causing it to swing to actuate the switch 23 which in turn actuates the motor 2 to rotate in the forward direction. This causes the drive sleeve 8 to turn in the forward direction through the pulley 4, belts 11, and pulley 10, so that the drive shaft 9 begins to be lowered together with the head plate 31, carriage 36, and cam bar 26. The downward movement of the cam bar 26 releases the pressure on the roller 18, allowing the clamping arms 14 and 15 to swing inward under the action of the spring 25 so that the strut 90 is clamped and retained on the bed plate 1b. The closure of the clamping mechanism 13 is sensed by a switch (not shown) which disconnects the clutch 3 and energizes the brake 5 to restrain the drive sleeve 8 and, hence, the drive shaft 9.

Then the operator places an upper spring seat on the top of the coil spring 91. Thereafter, the operator grips the handle 60 and 61 by hand and slides the carriage 36 upward or downward along the guide bars 32 and 33 to adjust the vertical position of the carriage in such a manner that the clamping hooks 48, 49, 58 and 59 are leveled between the first and second turns of the coil spring 91. The operator then pulls the handles 60 and 61 together or pulls only one of them inward. As mentioned hereinbefore, this causes all the four clamping arms to move in concert at an equal angular displacement together with their respective clamping hooks toward the center of the carriage, which is located on the plane X passing through the axes 37a and 38a and is aligned with the axis of the strut 90. If the center of the upper part of the coil spring initially positioned on the lower spring seat is offset from the axis of the strut, any one or more of the clamping hooks 48, 49, 58, 59 will first engage the second turn of the coil spring and urge it to move toward the opposite clamping hook or hooks until all the clamping hooks are in contact with the second turn of the coil spring. Thus, the closing movement of one or both handles automatically ensures centering of the coil spring. As all the four clamping arms 40, 44, 50, and 52 are interconnected with each other by way of teeth 41, 45, 51, and 53, levers 62 and 64, and link bar 65, the inward movement of the hooks 48, 49, 58, and 59 and the centering of the coil spring take place even though only one of the handles 60 and 61 is operated.

On turning on a manual switch, the motor 2 is rotated once again in the forward direction causing the drive shaft 9 to move further downward so that the head plate 31 is brought into contact with the bosses 37 and 38 causing the clamp carriage 36 to move downward together with the clamping hooks 48, 49, 58, and 59 engaging with the second turn of the coil spring. As the clamp carriage 36 descends, the clamping hooks grip the second turn of the coil spring and then compress it against the spring action. The downward movement of the drive shaft 9 is accompanied by a similar movement of the upper spring seat clamp 68, air cylinder 75, and cross member 27. When the drive shaft 9 has traveled through a predetermined distance, the lower dog 88 attached to the cross member 27 abuts against the lower limit switch 85 to turn off the motor 2. Simultaneously, a suitable switching mechanism, not shown, actuates the pneumatic cylinder 75 to bring the cam plate 77 into engagement with the clamping arms 69 and 70 to close them together, so that the upper spring seat is clamped by the clamp 68. Then, the operator screws a nut onto the upper threaded end of the strut 90 in a conventional manner to retain the upper spring seat thereon.

After the coil spring 91 has been assembled to the strut 90 in the foregoing manner, the operator turns on a switch (not shown) associated with the pneumatic cylinder 75 to release the upper spring seat from the spring seat clamp 68. The operator then actuates a switch (not shown) for the motor 2 to turn it in the reverse direction, causing the drive shaft 9 to shift upward together with the head plate 31 connected thereto. As the head plate 31 ascends, the downward pressure exerted by the head plate 31 on the clamp carriage 36 is released so that the clamp carriage is returned upward under the action of the coil spring 91 until the coil spring in a compressed state is retained between the upper and lower spring seats. As the drive shaft 9 is driven further, the head plate 31 moves upward away from the clamp carriage 36 which remains at the level of the upper part of the coil spring with its clamping hooks resting upon the second turn of the coil spring. The drive shaft 9 continues its upward movement until the upper dog 87 on the bar 86 mounted on the cross member 27 comes into contact with the upper limit switch 84, turning the motor 2 off. In this stage, the cam 26a at the upper end of the cam bar 26 is brought into engagement with the roller 18 so that the strut clamping mechanism 13 is released. The operator grips the handles 60 and 61 and slides the clamp carriage upward along the guide bars 32 and 33 until the clamping hooks disengage from the second turn of the coil spring. Thereafter, either of the operating handles is turned outward, causing the clamping arms to swing outward away from the coil spring, whereby the clamping hooks are retracted from the position between the first and second turns of the coil spring, as shown in FIG. 7. Thus, the assembled suspension subassembly can be taken out of the coil spring compressor.

I claim:

1. An improved coil spring compressor for use in the assembly of automotive suspension systems, said coil spring compressor being of the type including a base, a movable head plate positioned above said base for translational movement with respect to said base, means for driving said head plate toward and away from said base, a pair of spaced guide bars connected to and suspended from said head plate, a clamp carriage mounted on said guide bars for vertical sliding movement through a predetermined distance with respect to said head plate, said clamp carriage having a frontal opening of a sufficient size not to contact with and interfere with a coil spring to be compressed, at least four clamping arms mounted on said clamp carriage with two of them positioned along one side of said frontal opening to form a pair and with the remaining two of them positioned along the other side thereof to form another pair, each of said clamping arms having an outer end pivoted to said clamp carriage and an inner end movable toward and away from the coil spring extending through said frontal opening, said two clamping arms in each pair being positioned fore and aft with each other with respect to the plane passing through the axes of said guide bars to form a front and rear clamping arms and interconnected with each other so that, on swinging one of said arms in one direction, the other arm swings conjointly therewith at an equal angle but in the opposite direction, at least four clamping hooks each mounted at the vicinity of said inner end of each clamping arms for engagement with the coil spring, and a pair of operating handles each of which is connected to each of said front clamping arms, the improvement wherein:

said pairs of clamping arms are interconnected with each other by means of a linkage so that on actuating any one of said operating handles, all the four clamping arms swing in concert at an equal angular movement toward and away from the coil spring.

2. A coil spring compressor according to claim 1, wherein said linkage comprises a first lever mounted on said clamp carriage for pivotal movement integrally with said rear clamping arm in one pair, a second lever mounted on said clamp carriage for pivotal movement integrally with said front clamping arm in the other pair, and a link bar pivoted at an end to said first lever and at the other end to said second lever.

3. A coil spring compressor according to claim 2, wherein said link bar is substantially C-shaped so as not to interfere with the coil spring extending through said frontal opening of said clamp carriage.

* * * * *